United States Patent Office 3,146,224
Patented Aug. 25, 1964

3,146,224
PROCESS FOR PRODUCING REDUCED TRANSITION METAL HALIDES
Harry W. Coover, Jr., and Newton H. Shearer, Jr., Kingsport, Tenn., assignors to Eastman Kodak Company, Rochester, N.Y., a corporation of New Jersey
No Drawing. Filed Nov. 25, 1960, Ser. No. 71,415
11 Claims. (Cl. 260—93.7)

This invention relates to a novel process for the production of reduced transition metal halides and to the product thus produced. In a specific aspect this invention relates to an improved process for the polymerization of olefins to solid crystalline polymers with a catalyst containing novel reduced transition metal halides. In another specific aspect this invention relates to the polymerization of propylene and higher molecular weight olefinic hydrocarbons in the presence of a catalyst containing an improved reduced transition metal halide.

Solid, high molecular weight, crystalline polymers have been formed from propylene and higher molecular weight olefins using catalyst systems containing a reduced transition metal halide as one of the catalyst components. The reduced transition metal halide is an essential component of the catalyst and various methods have been employed to produce the reduced transition metal halides. One of the methods has involved the reduction of the transition metal halide from its maximum valence with hydrogen. The resulting product is a reduced transition metal halide, but when this halide is employed in the polymerization of propylene and similar olefins to solid, crystalline polymer, the reaction rates are rather low and uneconomical, and the polymeric product contains substantial amounts of atactic or amorphous polymer. Attempts to improve the polymerization rate in order to achieve an economical process have resulted primarily in increased production of the atactic or amorphous polymer without achieving the desired increase in the production of highly crystalline polymer.

Another method for producing reduced transition metal halides involves the reduction of a transition metal halide from its maximum valence with aluminum or other similar reducing metal. In this reaction the halide of the reducing metal is one of the products and the difficulties encountered in this process can be illustrated using aluminum as the reducing metal and titanium tetrachloride as the transition metal halide to be reduced. In the reaction of aluminum with titanium tetrachloride, aluminum trichloride and titanium trichloride are products of the reaction. The desired product is titanium trichloride but in order for the titanium trichloride to be useful in producing highly crystalline polymers it is essential that the aluminum trichloride be removed from the titanium trichloride. The problem of removing the aluminum trichloride is quite difficult and attempts to remove the aluminum trichloride by such procedures as extraction or sublimation have been only partially successful. It appears that the separation problem may be related to the fact that aluminum trichloride and titanium trichloride are isomorphous, and, consequently, they crystallize quite readily together in the same crystalline lattice. Thus, titanium trichloride prepared by an aluminum reduction reaction has been found to contain substantial amounts of aluminum trichloride and when the titanium trichloride is employed in olefin polymerization reactions the presence of the aluminum trichloride results in the formation of prohibitively large quantities of oily and amorphous polymers.

It is an object of this invention to provide a novel process for the production of reduced transition metal halides, such as titanium trichloride. It is another object of this invention to produce reduced transition metal halides having catalytic properties not attainable with prior art types of reduced transition metal halides. It is a further object of this invention to effect olefin polymerization reactions in the presence of catalysts containing our novel reduced transition metal halide to produce highly crystalline solid polymers and to substantially reduce the formation of oily and amorphous polymers in the polymerization reaction. Further and additional objects of this invention will be apparent from the detailed disclosure that follows.

In accordance with our invention, we have found that an improved form of a reduced transition metal halide can be obtained by reducing a halide of a transition metal selected from the group consisting of titanium, zirconium, vanadium, molybdenum and chromium with a reducing metal selected from Groups II and IIIa of the Periodic Table in the presence of a complexing agent that forms a complex with the halide of said reducing metal produced in the process, the complex of the halide of said reducing metal being substantially soluble in said complexing agent. The resulting product containing the reduced transition metal halide can be employed as it is formed by the reduction reaction and the Group II or IIIa metal halide in the product does not deleteriously affect the polymerization reaction. On the other hand, the Group I, II or III metal halide is readily separable from the transition metal halide in the reduction reaction product, and, as a result of our novel reduction reaction, it is possible to produce a reduced transition metal halide substantially free of free reducing metal halide.

The reducing metals that can be used in practicing our invention are selected from Groups II and IIIa of the Periodic Table. Among these reducing metals are beryllium, magnesium, zinc, calcium, strontium, barium, indium, thallium, aluminum and gallium. It is preferred to employ metallic aluminum in our reduction reaction, and if desired, the metallic aluminum can be employed in the form of a metal alloy with another metal, such as magnesium.

In the transition metal halides that are employed in our process the transition metal is selected from the group consisting of titanium, zirconium, vanadium, molybdenum and chromium and the halogen atoms are selected from the group consisting of chlorine, bromine and iodine. Prior to reduction, the transition metal is at its maximum valence and during the reduction a lower valency form of the transition metal is produced. We prefer to employ titanium tetrachloride in our process, and, as a result of the reduction reaction, titanium trichloride is formed.

The complexing agent that is used in our process forms a complex with the reducing metal halide produced in the reduction reaction. Thus, when metallic aluminum is used to reduce titanium tetrachloride, aluminum trichloride is formed, and the complexing agent forms a complex with the aluminum trichloride. The resulting complex is soluble in the complexing agent, and in most instances, the complex is also soluble in common organic solvents, such as toluene, xylene, benzene, and the like. As complexing agent or medium for carrying out the transition metal halide reduction reaction, we prefer to employ a diaryl ether. Among the diaryl ethers that can be used are diphenyl ether, ditolyl ether, dixylyl ether, phenyltolyl ether, di(biphenyl)ether, diphenylphenyl ether, di(ethylphenyl)ether, di(propylphenyl)ether, di(n-butylphenyl)ether and the like. We prefer to employ diphenyl ether in our process, and, if desired, the diphenyl ether can be used in admixture with biphenyl which is commonly known as Dowtherm.

Other complexing agents that can be used are amides, such as N,N-dimethyl formamide, acetamide, N,N-dimethyl acetamide, propionamide and the like. Ketones, such as benzophenone, acetophenone, butyrone and 3-pentanone are similarly useful in our process. Carboxylic esters, such as ether benzoate, ethyl malonate, butyl succinate, propyl adipate, ethyl sebacate, butyl naphthoate and the like are useful as complexing agents, and similarly phenols such as p-cresol, o-ethyl phenyl, m-propyl phenol and other similar alkyl phenols are useful in our process. Nitro-containing compounds and nitrile-containing compounds such as nitrobenzene, p-nitrotoluene, 2-nitro-p-cymene, benzonitrile, butyronitrile, capronitrile, 2-naphthol nitrile and the like can also be employed. The organic sulfur compounds, such as dimethyl sulfoxide, dimethyl sulfone, diethyl sulfate, N,N-dimethylbenzene sulfonamide, dimethyl sulfoximine, dibutyl sulfoxide, dioctyl sulfone, diphenyl sulfate, N,N-dipropyl benzene sulfonamide, diethyl sulfoxide, and the like, are also useful in our process. We have also found that organophosphorus compounds, such as hexa-alkyl phosphoramides, trialkyl and triaryl phosphates and trialkyl and triaryl phosphites are useful as reaction media or complexing agents. For example, hexamethyl phosphoric triamide, triphenyl phosphate, tricresyl phosphate, tridecyl phosphite, triethyl phosphite, triphenyl phosphite, triethyl phosphate, hexabutyl phosphoric triamide, hexaoctyl phosphoric triamide and the like can be similarly employed. In the organophosphorus compounds, the alkyl radicals usually contain 1 to 8 carbon atoms.

The details of our invention will be described using aluminum as the reducing metal, titanium tetrachloride as the transition metal to be reduced and diphenyl ether as the complexing agent or reaction medium. However, it will be understood that any of the reducing metals, transition metal halides and complexing agents set forth above can be similarly employed in the practice of our invention. The titanium tetrachloride is reduced to titanium trichloride with aluminum metal in diphenyl ether at a temperature usually within the range of 150 to 250° C. In the reaction from 0.9 to 2 times the stoichiometric quantity of aluminum required to reduce the titanium tetrachloride to titanium trichloride in accordance with the equation:

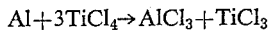

$$Al + 3TiCl_4 \rightarrow AlCl_3 + TiCl_3$$

is used. When the reduction reaction is conducted in the presence of diphenyl ether, aluminum trichloride formed during the reaction and diphenyl ether forms a complex in accordance with the following equation:

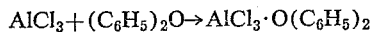

$$AlCl_3 + (C_6H_5)_2O \rightarrow AlCl_3 \cdot O(C_6H_5)_2$$

As a result of the formation of this complex co-crystallization of the aluminum trichloride and the titanium trichloride is prevented and the removal of aluminum trichloride from the reaction mixture is facilitated. The aluminum trichloride can be removed by filtering the hot reaction mixture, usually at the temperature used for the reduction reaction, since the aluminum trichloride-diphenyl ether complex is soluble in the diphenyl ether at reduction reaction temperatures. After filtration, the solid titanium trichloride can be washed with fresh hot diphenyl ether, and subsequently, with toluene or other organic solvent. The resulting titanium trichloride is a highly active catalyst component for olefin polymerization catalyst systems and it contains less than a one percent by weight of aluminum trichloride. It is not essential that the aluminum trichloride-diphenyl ether complex be separated from the titanium trichloride in order that the titanium trichloride will be effective as a catalyst component. Thus, the hot reduction reaction mixture can be cooled prior to filtering and in that event the titanium trichloride is admixed with aluminum trichloride-diphenyl ether complex. The titanium trichloride actually contains substantially no free or uncomplexed aluminum trichloride and the titanium trichloride prepared in this manner can be used effectively as a catalyst component in olefin polymerization reactions.

If desired, in the titanium tetrachloride reduction reaction from 1 to about 30 mole percent of the titanium tetrachloride can be replaced by another transition metal halide, such as vanadium tetrachloride, zirconium tetrachloride, molybdenum pentachloride, chromic chloride and the like. The resulting mixture of transition metal halides can be reduced with aluminum in the manner described above and the resulting mixture of reduced transition metal chlorides can be similarly employed in olefin polymerization reactions. The titanium trichloride in our process has been found to contain no titanium dichloride. Thus, in the reduction reaction, the titanium tetrachloride is converted or reduced to the titanium trichloride without the formation of any titanium dichloride.

The reduced transition metal halide, such as titanium trichloride that is produced in our process can be employed in olefin polymerization catalyst systems which have been employed heretofore for the preparation of solid, high molecular weight, crystalline polymers. Thus, the reduced transition metal halide can be employed with at least one catalyst component selected from the following: (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organo-aluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide. The polymerization reaction can be carried out in liquid phase in an inert organic liquid and preferably an inert liquid hydrocarbon vehicle, but excellent results can be obtained without using a solvent. The reaction proceeds with excellent results over a temperature range of from 0° C. to 250° C. but temperatures outside this range can be used if desired. Likewise, the reaction pressures may be varied widely from about atmospheric pressure to very high pressures of the order of 20,000 p.s.i. or higher. The liquid vessel employed is desirably one which serves as an inert liquid reaction medium.

The polymerization reaction is employed in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The polypropylene, polystyrene, polybutenes and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The polymerization reaction can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations of 5 to 10% by weight in a solution process are ordinarily less desirable because the polymer dissolved in the reaction medium results in a very viscous solution.

The organic vehicle employed in the polymerization reaction can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The polymerization reaction has been described above as being effective primarily for the polymerization of α-monoolefins. This process can also be used for polymerizing other α-olefins, and it is not necessary to limit the process of the invention to monoolefins. Other α-olefins that can be used are butadiene, isoprene, 1,3-pentadiene and the like.

The following examples are illustrative of the results obtainable by practicing our invention.

*Example 1*

One thousand cubic centimeters of a eutectic mixture of diphenyl ether and biphenyl (distilled and dried over sodium) and 329 cc. (568.8 g., 3 moles) of $TiCl_4$ were mixed in a 5-liter flask equipped with a high speed stirrer, water-cooled condenser and a dropping funnel with a side arm for blanketing both funnel and reaction flask with dry nitrogen. A small amount (approximately 0.5 to 1.0 g.) of anhydrous aluminum chloride was then added, and the mixture was heated to 170° C. To this hot, stirred mixture was added dropwise a suspension of aluminum powder (35.0 g., 1.3 atoms) in 550 cc. of dry diphenyl ether-biphenyl mixture. The reaction temperature was gradually increased to 210° C. during the addition of the aluminum powder. An additional 150 cc. of dry diphenyl ether-biphenyl mixture was used to wash any remaining aluminum powder from the dropping funnel into the reaction vessel. After the addition was complete the reaction mixture was stirred at 200° C. for 1 hour. The mixture was then cooled to 150° C. and filtered hot under nitrogen. The solid $TiCl_3$ product was the slurried with approximately 350 cc. of dry, hot (90 to 110° C.) toluene and filtered. This slurrying and filtering operation was carried out 3 times. When the product required was a dry powder, it was given a final wash with dry petroleum ether (350 cc.) or dry hexane or some other dry, inert solvent that is low boiling. The final traces of this solvent were removed by placing the solid $TiCl_3$ under 1–2 mm. pressure while heating on a steam bath. The yield was 370 g. or 80% of the theoretical (462 g., 3 moles). Similar results were obtained using two atoms of aluminum instead of 1.3 atoms.

*Example 2*

Sixty-two and nine-tenths grams (2.33 moles) of aluminum flake and 2500 cc. of diphenyl ether-biphenyl mixture (distilled and dried over sodium) were mixed in a 5-liter flask equipped with a stainless steel stirrer, an air cooled condenser, thermometer, dropping funel with side arm for blanketing both funnel and reaction flask with dry nitrogen. This reaction mixture was heated to 200° C. with stirring under an atmosphere of dry nitrogen. To this vigorously stirred suspension is added 1328.1 grams (7 moles) (769.4 cc.) of $TiCl_4$. The time required for this addition was approximately 3 hours. After the addition is completed, the reaction mixture was heated at 200° C. for approximately 1 hour then cooled to 150° C. and filtered. The solid $TiCl_3$ was then washed with a total of 2275 cc. of hot (150° C.) dry diphenyl ether-biphenyl mixture. This washing procedure was carried out in two successive slurrying and filtering operations at 150° C. using approximately one-half of the above total wash of dry diphenyl ether-biphenyl mixture in each operation. The $TiCl_3$ was then slurried and filtered twice with 825 cc. dry, hot (90 to 100° C.) toluene. The yield was 864 g. (80%) of the theoretical (1079.9 g., 7 moles).

Example 3

Example 1 was followed except that the reduction reaction mixture was cooled to room temperature before filtration and the solid product was washed with hexane. The yield was 700 g. of a mixture of $TiCl_3$ with an $AlCl_3$-diphenyl ether complex.

Example 4

Example 1 was followed except that 10 mole percent of the $TiCl_4$ was replaced with an equivalent quantity of $ZrCl_4$. In the same fashion highly active $TiCl_3$ compositions were also made using 1 to 30 mole percent of $VCl_4$, $WCl_6$, or $MoCl_5$ in place of a corresponding proportion of $TiCl_4$. The mixed catalysts provide a means of molecular weight control of the olefin polymer, yielding polypropylene of somewhat lower inherent viscosity than when straight $TiCl_4$ is used.

Example 5

Example 3 was followed with cooling of the reaction mixture to room temperature before filtration to retain the $AlCl_3 \cdot O(C_6H_5)_2$ complex admixed with the $TiCl_3$. However, in the present case, as in Example 4, a mixture of 90 mole percent $TiCl_4$ and 10 mole percent $VCl_4$ was used.

Example 6

In a nitrogen-filled dry box a dry 280-ml. stainless steel autoclave was loaded with a 1-gram catalyst charge comprising a 2:1:3 molar ratio of ethyl aluminum sesquichloride, hexamethyl phosphoric triamide and $TiCl_3$ (prepared by the hydrogen reduction of $TiCl_4$). The autoclave was capped, removed from the dry box, placed in a rocker and attached to a source of propylene. A 100-g. charge of propylene was added, the autoclave was rocked and was heated to 85° C. The resulting rate of polymerization was 16 g. of polypropylene per gram of total catalyst per hour. The amorphous content of the product was 3% with an inherent viscosity of 3.75.

Example 7

Example 6 was repeated using $TiCl_3$ prepared in Example 1. The resulting rate of polymerization corresponded to 85 g. of polypropylene per gram of total catalyst per hour and the amorphous content of the product was less than 1% and inherent viscosity was 3.98. The use of $TiCl_3$ prepared in Example 4 with 10 mole percent $ZrCl_4$ also gave highly crystalline polypropylene of 2.83 inherent viscosity.

Example 8

$TiCl_3$ prepared in Example 3 was used in place of the $TiCl_3$ in the procedure of Example 6. In this case the resulting rate of polymerization was 75 g. of polypropylene per gram of total catalyst per hour and the amorphous content of the product was 2% and inherent viscosity was 3.31. The use of $TiCl_3$ prepared in Example 5 with 10 mole percent $VCl_4$ also gave highly crystalline polypropylene of 1.67 inherent viscosity.

Example 9

In a nitrogen-filled dry box a 1-gram catalyst charge comprising equimolar quantities of triethyl aluminum and $TiCl_3$ prepared by the hydrogen reduction of $TiCl_4$ was added to a dry 280-ml. stainless steel autoclave. The autoclave was capped, removed from the dry box, placed in a rocker and attached to a propylene source. A 100-gram charge of propylene was added and the autoclave was rocked and heated to 70 C. The resulting rate of polymerization was 25 g. of propylene per gram of total catalyst per hour and the amorphous content of the product was 15%.

Example 10

Example 9 was repeated using the $TiCl_3$ prepared in Example 1. In this case the resulting rate of polymerization was 125 g. of polypropylene per gram of catalyst per hour and the amorphous content of the product was 5%. The $TiCl_3$ prepared in Example 3 provided a similar reduction in the amorphous content of the product, and a polymerization rate of 95 g. of polypropylene per gram of catalyst per hour.

Example 11

The procedure of Example 9 was followed using a 1-g. catalyst charge consisting of an equimolar mixture of lithium aluminum hydride, prior art $TiCl_3$ and sodium fluoride in 75 ml. of dry mineral spirits and using a reaction temperature of 170° C. The resulting rate of polymerization was 31.5 g. of polypropylene per gram of catalyst per hour and the amorphous content was 18%. When the $TiCl_3$ was replaced with the $TiCl_3$ prepared in Example 1, the resulting rate of polymerization was 100 g. of polypropylene per gram of catalyst per hour, and the amorphous content of the product was less than 5%. Similar results were obtained with the $TiCl_3$ prepared in Example 3.

Example 12

The procedure of Example 9 was followed using 1.5 g. of catalyst comprising an equimolar mixture of diethyl zinc and prior art $TiCl_3$, and using a reaction temperature of 85° C. The resulting rate of polymerization was 14 g. of polypropylene per gram of catalyst per hour, and the amorphous content of the product was 20%.

When the $TiCl_3$ in the above catalyst system was replaced with the $TiCl_3$ prepared in Example 1, the polymerization rate was increased to a value of 65 g. of polymer per gram of catalyst per hour and the amorphous content of the product was reduced to 5%.

Example 13

A mixture of 3.23 g. of tetraethyl lead, 1.54 g. of prior art titanium trichloride (made by hydrogen reduction of $TiCl_4$) and 100 ml. of dry heptane was placed in a 280-ml. stainless steel autoclave which had been dried thoroughly and purged with dry nitrogen. The autoclave was attached to a source of propylene and 51 g. of propylene was admitted. The autoclave was sealed and was heated to 200° C. The resulting rate of polymerization was 1.6 g. of polypropylene per gram of catalyst per hour and the amorphous content of the product was 5%.

Example 14

The procedure of Example 13 was followed except that the $TiCl_3$ prepared in Example 3 was used in place of the prior art $TiCl_3$. The rate of polymerization was 6.4 g. of polypropylene per gram of catalyst per hour and the amorphous content of the product was 4%.

Example 15

In a nitrogen-filled dry box a 1-g. catalyst charge comprising equimolar quantities of amyl sodium and prior art titanium trichloride was added to a dry 280-ml. stainless steel autoclave. The autoclave was capped, placed in a rocker and attached to a source of propylene. A 100-g. charge of propylene was added and the autoclave was heated to 60° C. The resulting rate of polymerization was 9.5 g. of polypropylene per gram of catalyst per hour and the amorphous content of the product was 40%.

When the prior art $TiCl_3$ in the above catalyst system was replaced with the $TiCl_3$ prepared in Example 1, the rate of polymerization was increased to 45 g. of polypropylene per gram of catalyst per hour and the amorphous content of the product was 5%.

Example 16

Improved polymerization rates and less amorphous polymer resulted when the new types of TiCl₃ were used in place of prior art TiCl₃ in the above noted catalyst systems as applied to the polymerization of 3-methyl-1-butene, 4-methyl-1-pentene, allylbenzene, styrene and vinylcyclohexane.

Example 17

Improved results in polymerization rates and in reduction of amorphous content of the polymer were realized when hexamethyl phosphoric triamide, N,N-dimethylformamide, triethyl phosphate, triethyl, phosphite, benzophenone, ethyl benzoate, p-cresol, nitrobenzene, benzonitrile, and diphenyl sulfone are used as complexing agents for the preparation of TiCl₃ in place of diphenyl ether.

The use of reduced transition metal halides produced in accordance with our invention in olefin polymerization catalysts results in a highly unexpected increase in the rate of polymerization when compared with prior art types of reduced transition metal halides. Also, the use of our reduced transition metal halides in olefin polymerization reactions results in the production of a polymer having an unexpectedly increased crystallinity and an unexpectedly decreased amorphous polymer content. From the results obtained with prior art and commercial types of reduced transition metal halides, the results we have realized could not have been foreseen.

Although the invention has been described in detail with reference to certain preferred embodiments thereof, variations and modifications can be effected within the spirit and scope of the invention as described hereinabove and as defined in the appended claims.

We claim:

1. The method for producing a reduced transition metal halide which comprises reacting a transition metal halide with a metal from Groups II and IIIa of the Periodic Table to form a halide of said metal from Groups II and IIIa of the Periodic Table in the absence of polymerizable compound and in the presence of a complexing agent that forms a complex with said halide of said metal from Groups II and IIIa of the Periodic Table, said complex being substantially soluble in said complexing agent and said reduced transition metal halide being substantially insoluble in said complexing agent, and recovering reduced transition metal halide from resulting reaction mixture.

2. The method for producing a reduced titanium halide which comprises reacting a titanium tetrahalide with a metal from Groups II and IIIa of the Periodic Table to form a halide of said metal from Groups II and IIIa of the Periodic Table in the absence of polymerizable compound and in the presence of a complexing agent that forms a complex with said halide of said metal from Groups II and IIIa of the Periodic Table, said complex being substantially soluble in said complexing agent and said reduced titanium halide being substantially insoluble in said complexing agent and separating reduced titanium halide from complexing agent containing dissolved complex.

3. The method for producing a reduced titanium halide which comprises reacting a titanium tetrahalide with aluminum to form an aluminum trihalide in the absence of polymerizable compound and in the presence of a complexing agent that forms a complex with said aluminum trihalide, said complex being substantially soluble in said complexing agent and said reduced titanium halide being substantially insoluble in said complexing agent and separating reduced titanium halide from complexing agent containing dissolved complex.

4. The method for producing a reduced titanium halide which comprises reacting a titanium tetrahalide with aluminum to form aluminum trihalide in the absence of polymerizable compound and in the presence of diphenyl ether and separating reduced titanium halide from diphenyl ether containing dissolved complex of diphenyl ether and aluminum trihalide.

5. The method for producing titanium trichloride which comprises reacting titanium tetrachloride with aluminum to form aluminum trichloride in the absence of polymerizable compound and in the presence of diphenyl ether and separating titanium trichloride from diphenyl ether containing dissolved complex of diphenyl ether and aluminum trichloride.

6. The method for producing titanium trichloride which comprises reacting titanium tetrachloride with aluminum at a temperature within the range of 150 to 250° C. to form aluminum trichloride in the presence of diphenyl ether and in the absence of polymerizable compound and separating titanium trichloride from diphenyl ether containing dissolved complex of diphenyl ether and aluminum trichloride.

7. The method for producing vanadium trichloride which comprises reacting vanadium tetrachloride with aluminum at a temperature within the range of 150 to 250° C. to form aluminum trichloride in the presence of hexamethyl phosphoric triamide and in the absence of polymerizable compound and separating vanadium trichloride from hexamethyl phosphoric triamide containing dissolved complex of hexamethyl phosphoric triamide and aluminum trichloride.

8. The method for producing a mixture of reduced transition metal chlorides which comprises reacting a mixture of titanium tetrachloride and vanadium tetrachloride with aluminum at a temperature within the range of 150 to 250° C. in the presence of diphenyl ether and in the absence of polymerizable compound and separating a mixture of titanium trichloride and vanadium trichloride from diphenyl ether containing complex of diphenyl ether and aluminum trichloride.

9. In a catalytic process for the polymerization of an α-olefinic hydrocarbon containing up to 10 carbon atoms to form solid crystalline polymer wherein a reduced transition metal halide and a reducing agent other than aluminum are employed as components of the catalyst, the improvement which comprises employing in said catalyst a reduced transition metal halide prepared by reacting a transition metal halide with a metal from Groups II and IIIa of the Periodic Table to form a halide of said metal from Groups II and IIIa of the Period Table in the absence of polymerizable compound and in the presence of a complexing agent that forms a complex with said halide of said metal from Groups II and IIIa of the Periodic Table, said complex being substantially soluble in said complexing agent and said reduced transition metal halide being substantially insoluble in said complexing agent and separating reduced transition metal halide from complexing agent containing dissolved complex.

10. In a catalytic process for the polymerization of propylene to form solid crystalline polymer wherein titanium trichloride and a reducing agent other than aluminum are employed as components of the catalyst, the improvement which comprises employing titanium trichloride prepared by reacting titanium tetrachloride with aluminum at a temperature within the range of 150 to 250° C. in the presence of diphenyl ether and separating titanium trichloride from diphenyl ether containing dissolved complex of diphenyl ether and aluminum trichloride.

11. In a catalytic process for the polymerization of propylene to form solid crystalline polymer wherein titanium trichloride and a reducing agent other than aluminum are employed as components of the catalyst, the improvement which comprises employing titanium trichloride prepared by reacting titanium tetrachloride with aluminum at a temperature within the range of 150 to 250° C. in the presence of hexamethyl phosphoric triamide and separating titanium trichloride from hexamethyl phosphoric triamide containing dissolved complex of hexamethyl phosphoric triamide and aluminum trichloride.

References Cited in the file of this patent

UNITED STATES PATENTS

| | | |
|---|---|---|
| 2,928,818 | Carter et al. | Mar. 15, 1960 |
| 2,959,576 | Payne | Nov. 8, 1960 |
| 2,962,487 | Coover | Nov. 29, 1960 |
| 2,969,346 | Coover et al. | Jan. 24, 1961 |
| 3,001,951 | Tornquist et al. | Sept. 26, 1961 |

FOREIGN PATENTS

| | | |
|---|---|---|
| 809,717 | Great Britain | Mar. 4, 1959 |
| 538,782 | Belgium | Dec. 6, 1955 |

OTHER REFERENCES

C. A. Thomas: "Anhydrous Aluminum Chloride," Reinhold Publishing Corp., 1941, pages 48–52 relied on.